United States Patent Office 2,801,405
Patented July 30, 1957

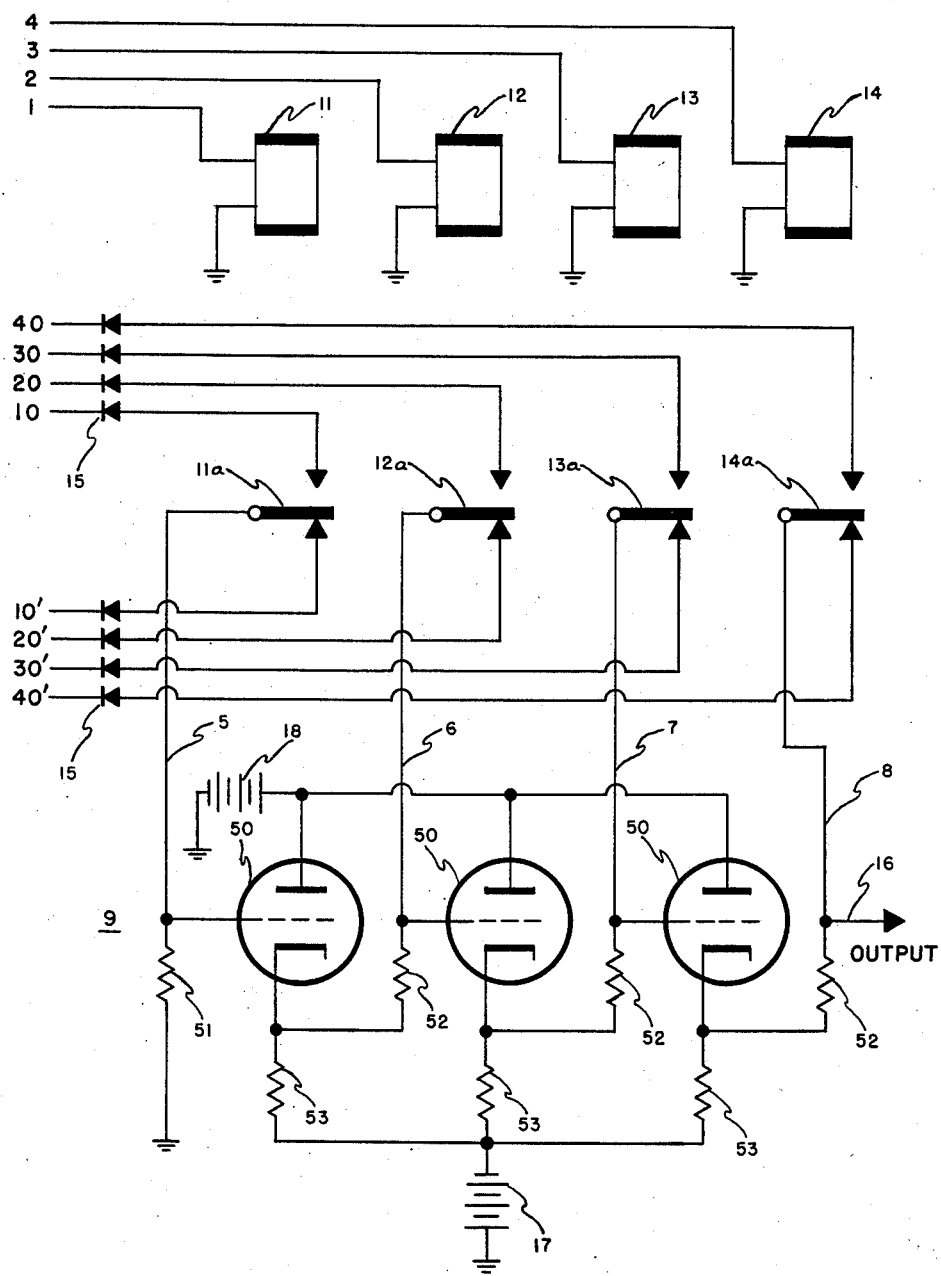

2,801,405

COMPARISON CIRCUIT

Walter S. Oliwa, Irvington, N. J., assignor to Monroe Calculating Machine Company, Orange, N. J., a corporation of Delaware Application May 24, 1956, Serial No. 587,079

6 Claims. (Cl. 340—149)

This invention relates to a comparison circuit and more particularly to a circuit for comparing two binary pulse coded items.

In data processing or information handling equipment and systems wherein data or information is expressed in binary code in the form of pulse patterns it is often desirable to compare one pulse pattern with another or group of pulse patterns. This comparison is useful for checking purposes or for readout of data or information. For instance, a pulse pattern may be compared with a series of pulse patterns presented in synchronism with the operation of an indicating mechanism with provision to record from or make visible the indicator or position thereof at the instant that the comparison is observed. Accordingly, it is the purpose of this invention to provide a comparison circuit useful for any of these functions.

Objects of the invention are:

To provide a simple yet fast operating comparison circuit.

To provide a comparison circuit wherein one pulse pattern selectively energizes a set of relays and another pulse pattern is selectively applied to the contacts of the set of relays.

To provide a coincidence circuit presenting an output only when all the inputs thereto are simultaneously present.

Other objects and a fuller understanding of the invention may be had by referring to the following description and claims, taken in conjunction with the accompanying drawing which shows an exemplified form of the invention.

With reference to the single figure of the drawing a set of relays equal in number to the maximum number of pulse positons in the system being utilized is provided. Four relays 11, 12, 13 and 14 are shown for use with a four pulse position code and particularly suited for a binary-coded decimal system of notation wherein four pulse positions are required to designate all of the decimal digits 0–9. A plurality of lines 1, 2, 3, 4, are connected to these relays and receive the respective pulses of a coded item for comparison: for example, ground potential for no pulse and positive going potential pulses for pulse condition. The relays connected to the lines on which pulses are present are energized pulling up their respective armatures and movable contact arms or springs 11a, 12a, 13a and 14a. Thus if pulses are presented on lines 1 and 4 and none are presented on lines 2 and 3, relays 11 and 14 will be energized to connect the movable contact arms 11a and 14a to their upper contacts while relays 12 and 13 will remain deenergized and the movable contact arms 12a and 13a will be connected to their lower contacts.

The coded item with which a comparison is to be made is applied to the lines labeled 10, 20, 30 and 40 and 10', 20', 30' and 40'. Assuming that pulses are represented as positive going pulses and no pulses are represented by the application of reference potential, then on lines 10, 20, 30 and 40 will be presented the pulses representing the item against which comparison is to be made. Lines 10', 20', 30' and 40' will receive the inverse of what is applied to lines 10, 20, 30 and 40, respectively; if an unprimed line receives a pulse, the respective primed line has reference potential applied thereto, while if an unprimed line receives reference potential, the respective primed line receives a pulse. Lines 5, 6, 7 and 8 are respectively connected to contact springs 11a, 12a, 13a and 14a and each of these lines is connected to a four input AND circuit 9 from which an output is taken. AND circuit 9 may include three triodes 50 operated as cascaded cathode followers with their anodes connected to a suitable source of positive potential 18 and their cathodes connected via cathode resistors 53 to a suitable source of negative potential 17. A resistor 52 is connected between the cathode of a tube 50 and one of lines 6, 7 or 8. A resistor 51 is connected between ground potential and line 5. The grid of the first tube 50 in the chain is connected to the junction of line 5 and resistor 51 while the grids of the following two tubes 50 are connected to the junction of lines 6 and 7 with their related resistors 52, respectively. An output line 16 is connected to the junction of line 8 and its resistor 52.

With the circuit shown the potential of the cathode source 17 may be —20 volts and the signals applied to lines 10, 20, 30 and 40 and 10', 20', 30' and 40' may be at approximately —25 volts for not pulse condition and at approximately +5 volts for pulse condition. An output, positive going from approximately —20 volts, the potential of source 17, to approximately 0 volts will appear on line 16 when, and only when, the pulse conditions applied to lines 10, 20, 30, 40, 10', 20', 30' and 40' coincide with the pulse conditions applied to lines 1, 2, 3 and 4.

When the potential value applied to any of lines 5, 6 or 7 is at the low or no pulse condition (—25 volts), the grids of triode 50 to which the lines are connected will be maintained below cutoff potential and the respective tubes will remain non-conducting. Conduction in each of tubes 50 is required before a positive going output on line 16 can be obtained. When a positive or pulse condition exists on a line 5, 6 or 7, the potential across the respective diodes attempting to pass current therethrough in the direction of high impedance will result in the diodes effectively disconnecting the said lines from their respective triode grids. The potential on the triode grids will then be almost solely dependent on the condition of the preceding triode: below cutoff if preceding triode is non-conducting but conduction-supporting if preceding triode is conducting.

Line 8 with a low potential thereon will maintain the output line 16 at a low potential regardless of the states of the triodes 50 but will be effectively disconnected from control of the potential on line 16 when the pulse condition of lines 40—40' and 4 coincide with the result that the potential across the respective diode connected to line 40 or 40' attempts to pass current therethrough in the direction of high impedance.

Although I have described my invention with a certain degree of particularity, it is understood that the present disclosure has been made only by way of example and that numerous changes in the details of construction may be resorted to without departing from the spirit and scope of the invention as hereinafter claimed.

1. A circuit for comparing two binary coded items comprising a plurality of relays having normally open and normally closed contacts, said relays being selectively operated in accordance with one of said items, means for applying potentials to said normally open contacts in accordance with the other of said items, means for applying potentials to said normally closed contacts the inverse of the potentials in accordance with the other of said items and coincidence means connected to the movable contact members of said relays.

2. A circuit for comparing two binary coded items comprising a plurality of relays having normally open and normally closed contacts, said relays being selectively operated in accordance with one of said items, a plurality of unilateral conducting devices connected to the fixed contacts of said relays, one per contact, means for applying potentials to said devices connected to said normally open contacts in accordance with the other of said items, means for applying potentials to said devices connected to said normally closed contacts the inverse of the potentials in accordance with the other of said items and coincidence means connected to the movable contact members of said relays.

3. The combination as set forth in claim 2 wherein said coincidence means comprises a plurality of electronic switches, one less in number than the number of said relays, connected in cascade, each of said switches including a control member and an output member, the control member of each of said switches being connected to the movable contact member of one of said relays, and an output conductor connected to the output member of the last switch in said cascade to which is connected the movable contact member of said other relay.

4. A coincidence circuit comprising a plurality of electronic switches connected in cascade, each of said switches including a control member and an output member, a plurality of input conductors one more in number than the number of said switches, the control member of each of said switches being connected to one of said input conductors, respectively, an output conductor connected to the output member of the last switch in said cascade to which is connected the other of said input conductors, wherein a high output signal is present on said output conductor only when high input signals are simultaneously presented to each of said input conductors.

5. A coincidence circuit comprising a plurality of electronic tubes, each tube having a cathode, an anode and a control grid, each of said anodes being connected to a source of positive potential and each of said cathodes being connected through a resistor to a source of negative potential, said tubes being connected in cascade wherein the cathode of one tube is connected through a resistor to the control grid of the following tube, a plurality of input conductors one more in number than the number of said tubes, the control grid of each of said tubes being connected to one of said input conductors, respectively, a resistor connecting the control grid of the first tube in said cascade to a source of potential intermediate said anode and cathode potentials and an output conductor to which is connected said other input conductor connected through a resistor to the cathode of the last tube in said cascade.

6. A circuit for comparing two binary coded items comprising a plurality of electronic tubes, each tube having a cathode, an anode and a control grid, each of said anodes being connected to a source of positive potential and each of said cathodes being connected through a resistor to a source of negative potential, said tubes being connected in cascade wherein the cathode of one tube is connected through a resistor to the control grid of the following tube, a resistor connecting the control grid of the first tube in said cascade to a source of potential intermediate said anode and cathode potentials, a plurality of relays, one more in number than the number of said tubes, said relays having normally open and normally closed contacts, the control grid of each of said tubes being connected to the movable contact member of one of said relays, respectively, and a plurality of diodes connected to said relay fixed contacts, one diode per fixed contact, for receiving signals more positive than said intermediate potential or more negative than said negative potental, wherein said relays are selectively operated to represent one of said items, said diodes connected to said normally open contacts have applied thereto signals in accordance with the other of said items and said diodes connected to said normally closed contacts have applied thereto signals the inverse of those in accordance with the other of said items.

References Cited in the file of this patent

UNITED STATES PATENTS

| 2,615,127 | Edwards | Oct. 21, 1952 |
| 2,674,727 | Spielberg | Apr. 6, 1954 |
| 2,700,756 | Estrems | Jan. 25, 1955 |